(12) United States Patent
Lee

(10) Patent No.: US 7,014,201 B2
(45) Date of Patent: Mar. 21, 2006

(54) REAR SUSPENSION SYSTEM OF AN AUTOMOTIVE VEHICLE

(75) Inventor: Un-Koo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 238 days.

(21) Appl. No.: 10/658,908

(22) Filed: Sep. 9, 2003

(65) Prior Publication Data

US 2004/0046347 A1    Mar. 11, 2004

(30) Foreign Application Priority Data

Sep. 11, 2002  (KR) ................. 10-2002-0054893

(51) Int. Cl.
*B60G 3/12*    (2006.01)
(52) U.S. Cl. .............. 280/124.13; 280/124.128; 280/124.153
(58) Field of Classification Search ......... 280/124.128, 280/124.13, 124.132, 124.134, 124.135, 280/124.143, 124.144, 124.145, 124.153
See application file for complete search history.

(56) References Cited

U.S. PATENT DOCUMENTS

| | | | | |
|---|---|---|---|---|
| 3,083,032 A | * | 3/1963 | Cuskie | 280/124.152 |
| 3,151,877 A | * | 10/1964 | Bajer | 280/124.134 |
| 4,453,733 A | * | 6/1984 | Sautter et al. | 280/124.128 |
| 4,545,601 A | * | 10/1985 | Muller et al. | 280/124.153 |
| 4,696,488 A | | 9/1987 | Mitobe et al. | |
| 4,717,171 A | | 1/1988 | Kami et al. | |
| 4,740,011 A | | 4/1988 | Mitobe et al. | |
| 4,758,018 A | * | 7/1988 | Takizawa et al. | 280/124.133 |
| 4,765,647 A | | 8/1988 | Kondo et al. | |
| 4,832,363 A | | 5/1989 | Mitobe | |
| 5,009,449 A | * | 4/1991 | Edahiro et al. | 280/124.133 |

FOREIGN PATENT DOCUMENTS

| | | |
|---|---|---|
| EP | 0271 879 B1 | 8/1993 |
| EP | 0 728 959 B1 | 1/2000 |
| JP | 60080914 A * | 5/1985 |

* cited by examiner

*Primary Examiner*—Ruth Ilan
(74) *Attorney, Agent, or Firm*—Morgan Lewis & Bockius LLP

(57) ABSTRACT

A rear suspension system of an automotive vehicle is disclosed. A trailing arm is disposed in a lengthwise direction of a vehicle body, and a mounting bush secures a leading end portion of the trailing arm to the vehicle body. A protrusion member protrudes from an outside circumference of the mounting bush. A coupling is provided on the leading end portion of the trailing arm, for making the length of the protrusion member varied in accordance with an external force imposed on the trailing arm. Thus, the wheel alignment is maintained at the tow-in during a braking or turning, and therefore, the vehicle posture is stabilized during the braking or turning.

4 Claims, 5 Drawing Sheets

REAR SUSPENSION SYSTEM OF AN AUTOMOTIVE VEHICLE

CROSS-REFERENCE TO RELATED APPLICATIONS

This application claims priority of Korean Application No. 2002-54893, filed on Sep. 11, 2002, the disclosure of which is incorporated fully herein by reference.

FIELD OF THE INVENTION

The present invention relates to a rear suspension system of an automotive vehicle, and more particularly, to a rear suspension system in which the coupling structure between the front leading end portion of a trailing arm and mounting bush of the vehicle body is configured to maintain wheel tow-in when braking or turning.

BACKGROUND OF THE INVENTION

In a front wheel drive vehicle, generally, the rear suspension system includes a wheel hub assembly for installing the wheel in a manner capable of idle revolutions, a trailing arm for securing the wheel hub assembly to the vehicle body in the lengthwise direction, and upper and lower arms for supporting the wheel hub assembly to the vehicle body in the lateral direction.

In conventional rear suspension systems, the braking force generated by friction between the wheels and the road surface during braking is imposed from the front of the wheels, the wheels being installed on the wheel hub assemblies. Accordingly, the wheels tend to pivot the trailing arms outward from the vehicle body.

This phenomenon makes the wheel alignment varied from tow-in to tow-out. If this occurs, the stability of the vehicle is jeopardized when the vehicle brakes or turns during movement.

SUMMARY OF THE INVENTION

The present invention provides a rear suspension system of a vehicle, in which the mounting structure of the trailing arm is configured to maintain the wheel alignment at tow-in during a braking or turning of the vehicle, thereby stabilizing the vehicle posture during a braking or turning maneuver vehicle.

In accordance with one embodiment of the present invention, a rear suspension system of an vehicle includes a trailing arm disposed in a lengthwise direction with respect to the vehicle body, a mounting bush for securing the leading end portion of the trailing arm to the vehicle body, a protrusion member protruding from an outside circumference of the mounting bush, and coupling means provided on the leading end portion of the trailing arm. The protrusion member is inserted into the trailing arm to vary its length in accordance with an external force imposed on the trailing arm.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENTS

Figure 1:
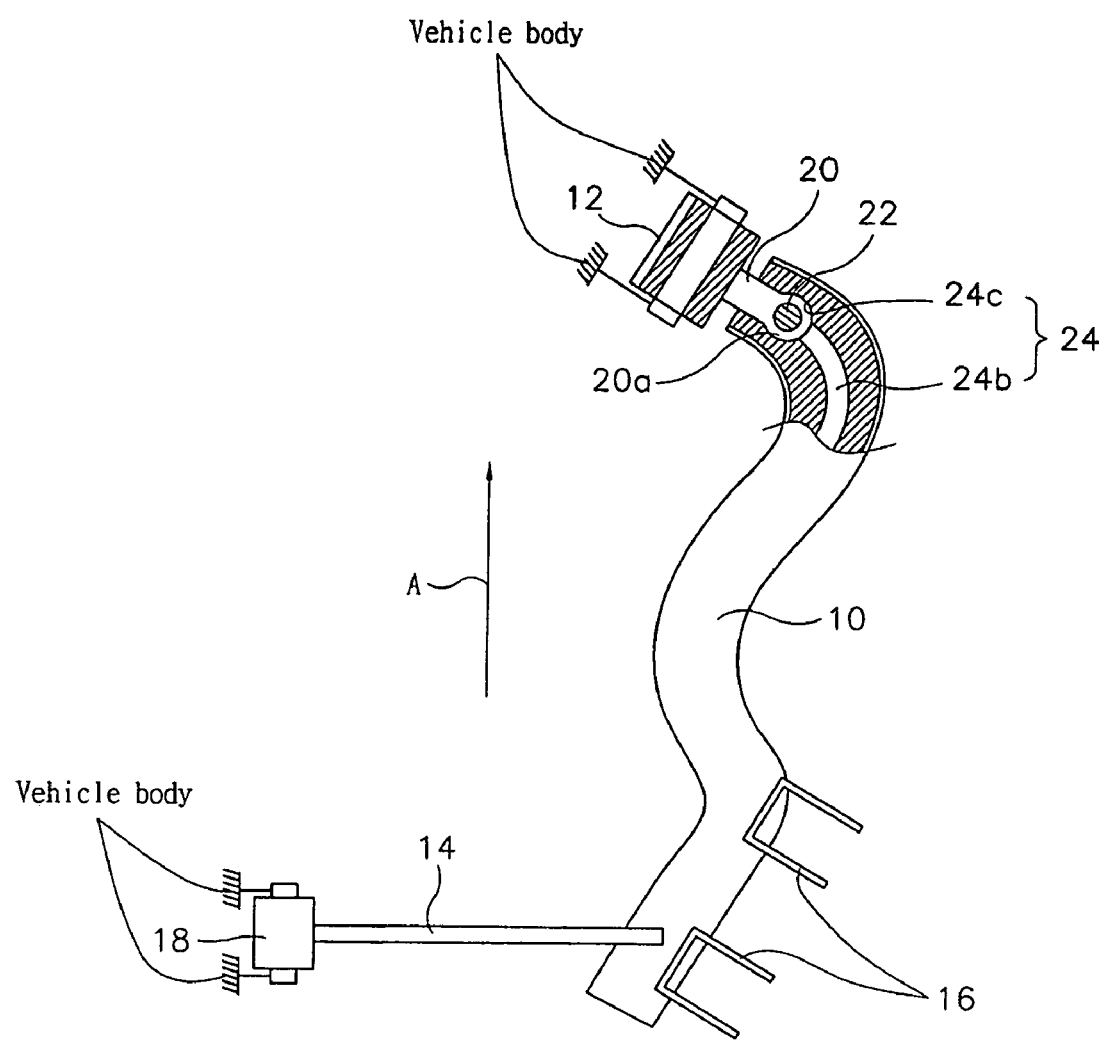
FIG. 1 illustrates the rear suspension system of an automotive vehicle according to the present invention.
Figure 2:
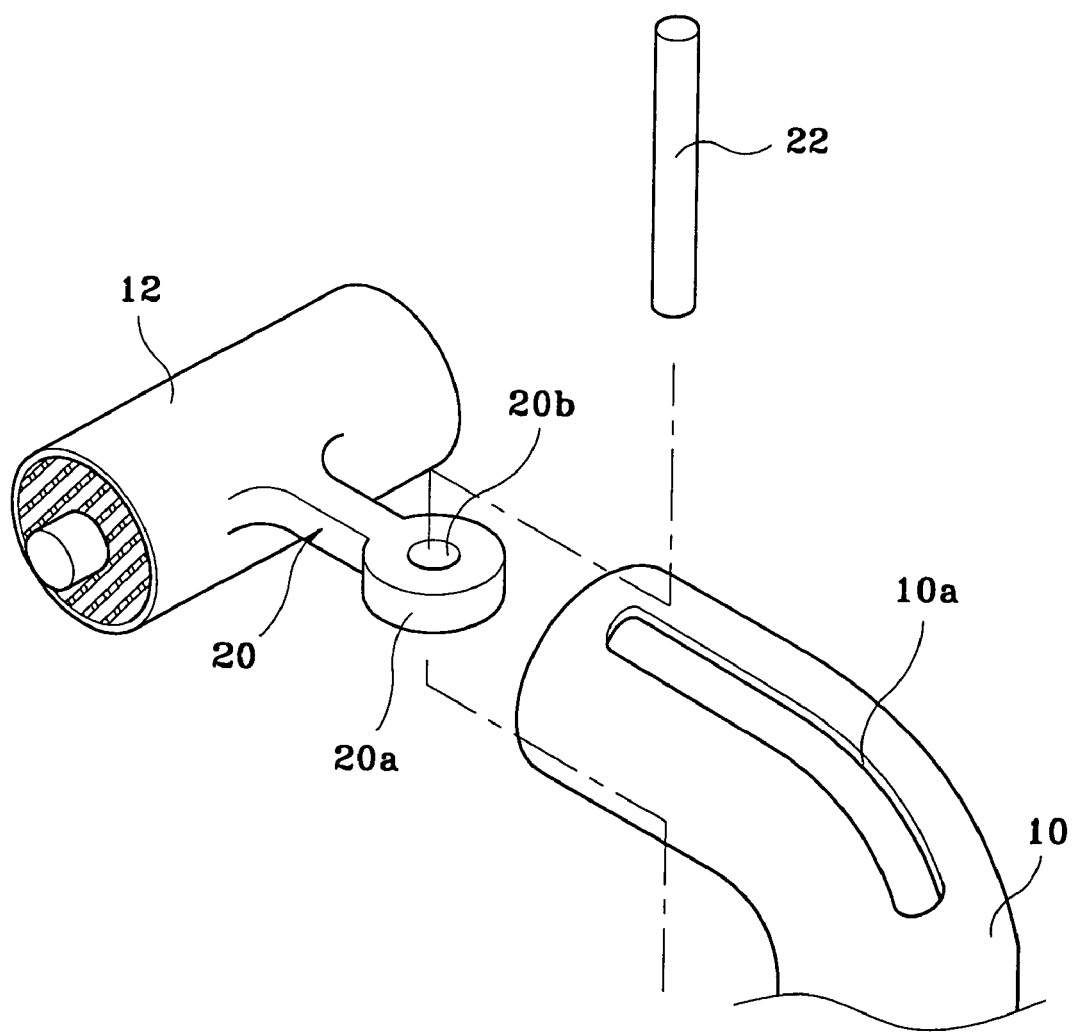
FIG. 2 is an exploded perspective view of the upper end portion of FIG. 1.

As shown in FIGS. 1 and 2, a trailing arm 10 is disposed in the lengthwise direction of the vehicle body. Particularly, the front leading end portion of the trailing arm 10 is secured to the vehicle body through a mounting bush 12. Arrow A generally indicates the forward direction of the vehicle body.

A lower arm 14 is coupled at a rear end portion of the trailing arm 10 to support the trailing arm 10 in the lateral direction relative to the vehicle body. Outwardly to the rear end portion of the trailing arm 10, there is coupled a pair of mounting brackets 16 for coupling the wheel hub assembly which supports the wheel.

Further, a mounting bush 18 is secured to the leading end of the lower arm 14 to the side of the vehicle body.

The mounting bush 12 is coupled to the front end of the trailing arm 10 by means of a pin joint. That is, a protrusion member 20 protrudes from the circumference of the mounting bush 12. At the front leading end of the trailing arm 10, there is formed a pin joint coupling means including a pin 22 and protrusion member 20. The protrusion member 20 is provided with a through hole 20b for receiving the pin 22. The protrusion member 20 is expanded toward its end, and the expanded portion forms a round engaging part 20a.

In a preferred embodiment, the coupling means which is formed at the front leading end of the trailing arm 10 is formed in such a manner as to elastically receive the engaging part 20a, and includes an elastic member 24 such as rubber adhered by using a vulcanization adhesive or the like. The elastic member 24 is provided with an axial hole 24b which has a width smaller than that of the engaging part 20a, so that the engaging part 20a can move along it, with the pin 22 inserted therein.

The engaging part 20a of the protrusion member 20 is received in the axial hole 24b, and for this purpose, a round receiving space 24c is formed in the axial hole 24b.

An elongate slot 10a is formed in the front leading end portion of the trailing arm 10, so that the pin 22 can be inserted into it, for forming a pin joint coupling between the engaging part 20a of the protrusion member 20 and the axial hole 24b of the elastic member 24.

Figure 3:
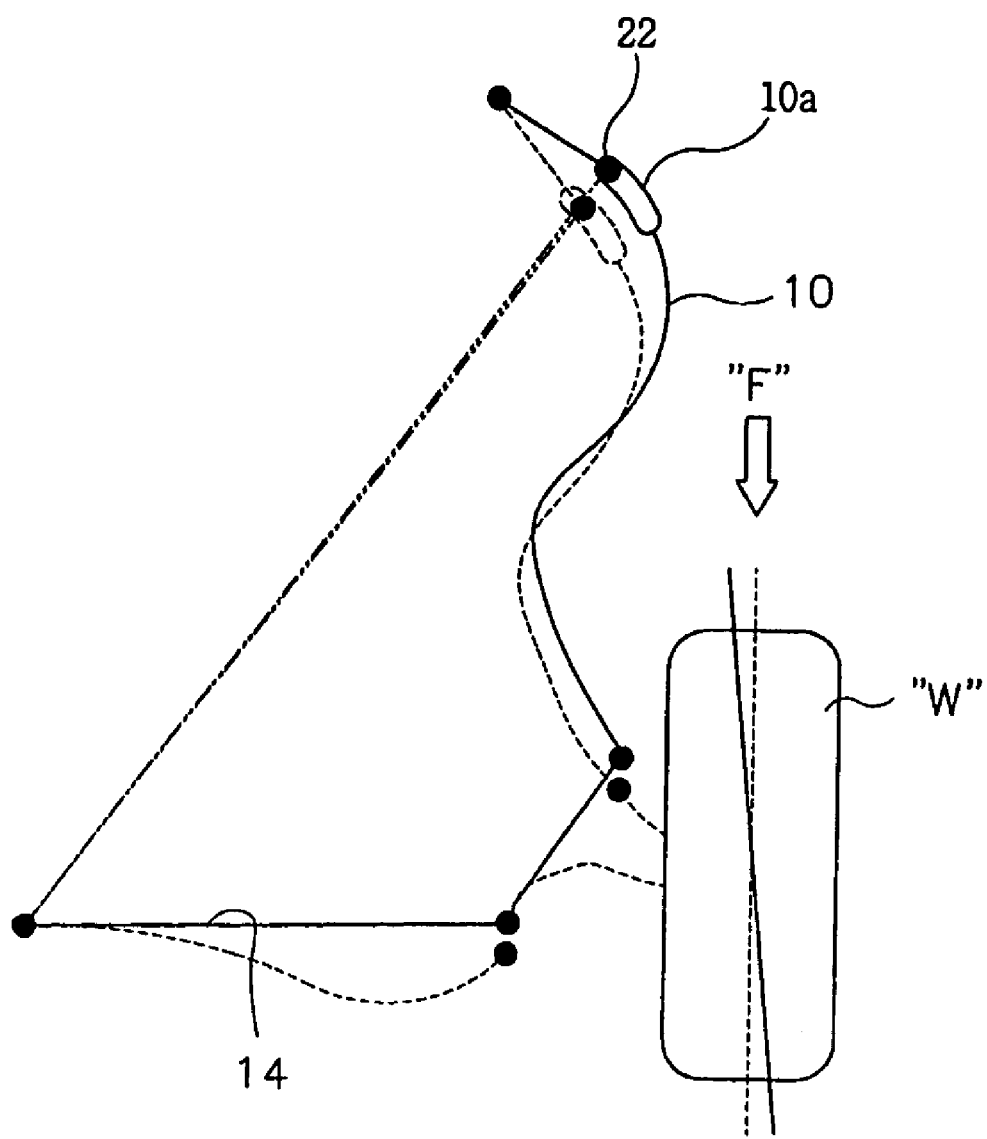
FIG. 3 schematically illustrates a posture change of the trailing arm of the rear suspension system of FIG. 1.

As shown in FIG. 3, when an external force F acts on the wheel W from the front to rearward during braking or turning, the engaging part 20a of the protrusion member 20 departs from the receiving space 24c of the elastic member 24 to move into the axial hole 24b. This results in the length of the protrusion member 20, as inserted into the trailing arm 10, being extended. That is, the protrusion member 20 and the elastic member 24 of the trailing arm 10 are pressed together. However, they act like rigid parts up to a certain level of load.

However, if the elastic member 24 departs from the pre-load limit due to braking or turning, then the pin joint coupling portion between the protrusion member 20 of the mounting bush 12 and the elastic member 24 of the trailing arm 10 is dislocated, resulting in the trailing arm 10 being dislocated from the position of the solid lines to the position of the dotted lines. Consequently, the wheel alignment of the rear wheel which is installed on the trailing arm 10 can be altered to tow-in. The degree of the tow-in will be described later.

Further, upon completing braking or turning, the elastic member 24, which elastically supports the engaging part 20$a$ of the protrusion member 20, pushes the engaging part 20$a$ to the round receiving space 24$c$. As a result, the engaging part 20$a$ moves into the receiving space 24$c$ which is formed in the elastic member 24 of the trailing arm 10. Accordingly, the wheel alignment of the rear wheel can be restored to the original position.

Under this condition, the pin 22, which passes through the through hole 20$b$ and the elongate slot 10$a$ of the trailing arm 10 as well as the axial hole 24$b$ of the elastic member 24, contributes to maintaining the coupling between the trailing arm 10 and the mounting bush 12.

The variation degree of the wheel alignment in the rear wheel mounted on the trailing arm 10 is as follows.

First, the coupling between the protrusion member 20 and the elastic member 24 behaves like a rigid connection when the vehicle moves at a low velocity (that is, when a small load is imposed between the protrusion member 20 and the receiving space 24$c$). This is due to the inherent pre-load of the elastic member 24 which elastically supports the engaging part 20$a$ of the protrusion member 20.

If the elastic member 24 departs from the pre-load limit during movement of the vehicle, (that is, if a large load is imposed between the protrusion member 20 and the receiving space 24$c$), then the elastic member 24 is deformed, and the engaging part 20$a$ of the protrusion member 20 passes beyond the receiving space 24$c$ to cause an alteration in the wheel alignment of the rear wheel.

Under this condition, the mentioned movement during the movement of the vehicle increases proportionally to the magnitude of the load which is imposed between the protrusion member 20 and the elastic member 24. That is, the wheel alignment of the rear wheel is altered to a small tow-in under a light load, while the wheel alignment is altered to a large tow-in under a heavy load, thereby improving the turning performance and the steering capability.

Figure 4:
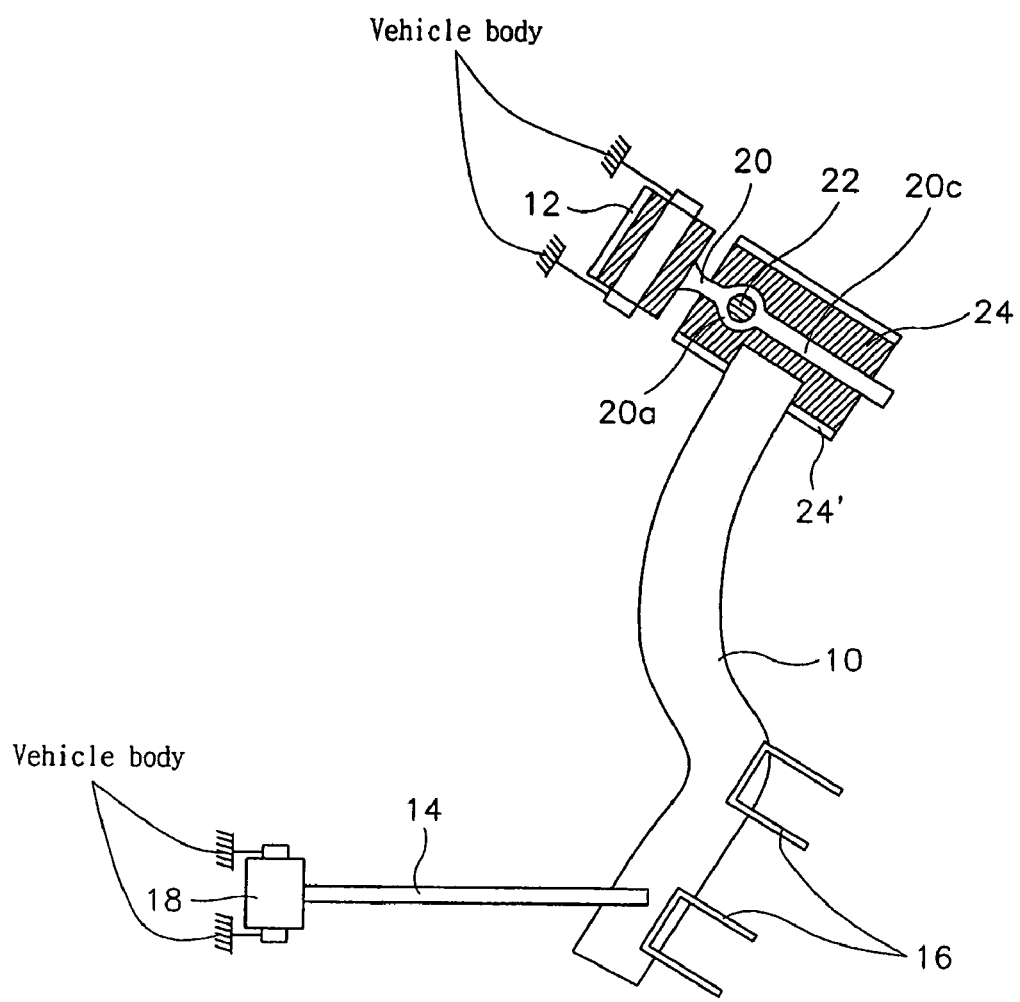
FIGS. 4 and 5 illustrate a second embodiment of the present invention corresponding to FIGS. 1 and 2, respectively.
Figure 5:
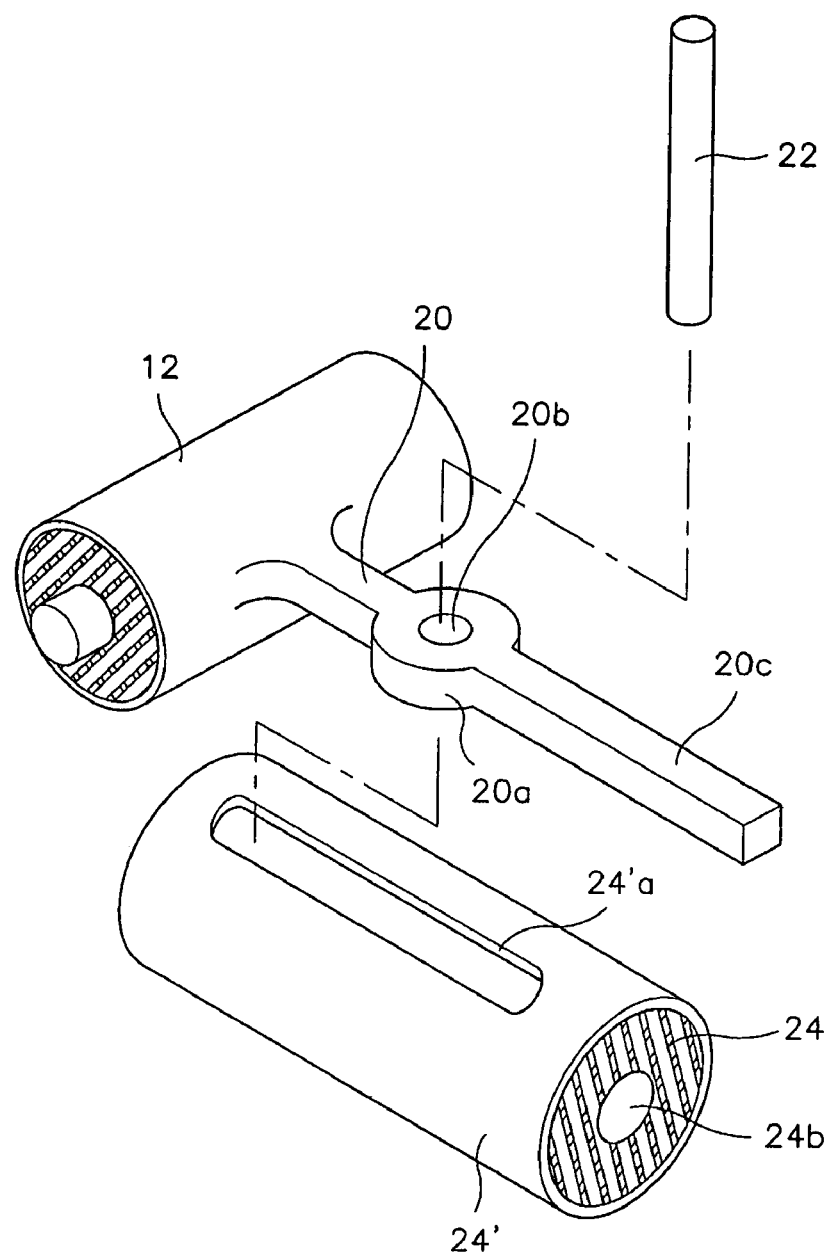

An alternative embodiment of a rear suspension system according to the present invention is illustrated in FIGS. 4 and 5. As shown in these drawings, the coupling between the front end of the trailing arm 10 and the mounting bush 12 is formed with a pin joint similar to the first embodiment described above. That is, a protrusion member 20 protrudes from the circumference of the mounting bush 12, and a coupling means for forming a pin joint is provided at the front end of the trailing arm 10. The pin joint includes a pin 22 and the protrusion member 20 of the mounting bush 12.

The protrusion member 20 of the mounting bush 12 is provided with a through hole 20$b$ for receiving the pin 22. The protrusion member 20 expands from the mounting bush 12, and the expanded portion forms a round engaging part 20$a$. Further, an extension part 20$c$ extends beyond the engaging part 20$a$ to extend the length of the protrusion member 20.

The coupling means includes a cylindrical installation member 24' coupled to the front leading end of the trailing arm 10 like the mounting bush of FIG. 1, and an elastic member 24 for elastically receiving the engaging part 20$a$ of the protrusion member 20 to secure its position. Elastic member 24 may be made of rubber adhered by using a vulcanization adhesive or the like.

An axial hole 24$b$ is formed along the axis of the elastic member 24, the diameter of the axial hole 24$b$ being smaller than the width of the engaging part 20$a$ so as to accommodate the engaging part 20$a$ of the protrusion member 20.

The axial hole 24$b$ includes a round receiving space 24$c$ (refer to FIG. 1), for receiving the engaging part 20$a$ of the protrusion member 20.

An elongate slot 24'$a$ is formed in the installation member 24', for slidably receiving a pin 22, the engaging part 20$a$ of the protrusion member 20 being inserted into the axial hole 24$b$ of the elastic member 24. This elongate slot 24'$a$ serves the role of making the pin 22 slide alone the axial hole 24$b$.

A lower arm 14 is coupled to the inside of the rear end of the trailing arm 10, for supporting the trailing arm 10 toward the vehicle body. Further, a pair of mounting brackets 16 are coupled to the outside of the rear end portion of the trailing arm 10, for coupling the wheel hub assembly which supports the wheel.

A mounting bush 18 is secured to the other end of the lower arm 14 (toward the vehicle body), for coupling the lower arm 14 to the vehicle body.

The action of this alternative embodiment of the present invention is similar to that of the first embodiment.

According to the present invention as described above, the mounting structure of the trailing arm 10 of the front portion of the vehicle body is altered, so as to maintain wheel alignment at tow-in during braking or turning of the vehicle, thereby stabilizing the vehicle posture.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A rear suspension system of an automotive vehicle, comprising:
    a trailing arm with a leading end portion;
    a mounting bush for securing the leading end portion of said trailing arm to a vehicle body;
    a protrusion member having a length protruding from an outside circumference of said mounting bush; and
    coupling means provided on the leading end portion of said trailing arm, for varying the length of said protrusion member inserted into the trailing arm in accordance with an external force imposed on said trailing arm;
    wherein said protrusion member is provided with a round engaging part, and the coupling means includes an elastic member; and
    wherein an axial hole is formed in said elastic member, having a width smaller than that of the engaging part; and said axial hole including a round receiving space for said engaging part.

2. The rear suspension system as claimed in claim 1, wherein an elongate slot is formed in a front leading end portion of said trailing arm, for receiving a pin of a pin joint as the coupling means, said pin joint including said axial hole and said engaging part of said protrusion member.

3. A rear suspension system of an automotive vehicle, comprising:
- a trailing arm with a leading end portion:
- a mounting bush for securing the leading end portion of said trailing arm to a vehicle body;
- a protrusion member having a length protruding from an outside circumference of said mounting bush; and
- coupling means provided on the leading end portion of said trailing arm, for varying the length of said protrusion member inserted into the trailing arm in accordance with an external force imposed on said trailing arm;
- wherein said protrusion member comprises a round expanded engaging part with a through hole formed therein and an extension part integrally extending beyond said engaging part; and
- wherein the coupling means comprises a cylindrical installation member coupled to the leading end portion of said trailing arm and an elastic member; and
- wherein said elastic member is provided with an axial hole, for accommodating said engaging part, said axial hole having a width smaller than that of said engaging part; and said axial hole having a round receiving space for said engaging part.

4. The rear suspension system as claimed in claim 3, wherein said installation member has an elongate slot for inserting a pin of a pin joint as the coupling means, said pin joint including said engaging part and said axial hole.

* * * * *